(12) United States Patent
De Jong

(10) Patent No.: US 10,227,189 B2
(45) Date of Patent: Mar. 12, 2019

(54) SYSTEM FOR BLOCKING A VEHICLE, METHOD THEREFOR AND DOCK PROVIDED THEREWITH

(71) Applicant: Stertil B.V., Kootstertille (NL)

(72) Inventor: Jurjen Jan De Jong, Kootstertille (NL)

(73) Assignee: Stertil B.V., Kootstertille (NL)

( * ) Notice: Subject to any disclaimer, the term of this patent is extended or adjusted under 35 U.S.C. 154(b) by 0 days.

(21) Appl. No.: 15/507,072

(22) PCT Filed: Jul. 1, 2015

(86) PCT No.: PCT/NL2015/050482
§ 371 (c)(1),
(2) Date: Feb. 27, 2017

(87) PCT Pub. No.: WO2016/032323
PCT Pub. Date: Mar. 3, 2016

(65) Prior Publication Data
US 2017/0253443 A1 Sep. 7, 2017

Related U.S. Application Data

(60) Provisional application No. 62/043,682, filed on Aug. 29, 2014.

(30) Foreign Application Priority Data

Aug. 29, 2014 (NL) ...................................... 2013389

(51) Int. Cl.
*B65G 69/00* (2006.01)

(52) U.S. Cl.
CPC .................................. *B65G 69/005* (2013.01)

(58) Field of Classification Search
CPC .............. B65G 69/005; B65G 69/2882; B65G 69/2888; B60T 3/00; B60P 3/077
See application file for complete search history.

(56) References Cited

U.S. PATENT DOCUMENTS

2011/0233006 A1 9/2011 De Jong
2013/0341130 A1 12/2013 De Jong

FOREIGN PATENT DOCUMENTS

EP 2236445 A1 10/2010
NL 2004466 C 10/2011

*Primary Examiner* — Xuan Lan Nguyen
(74) *Attorney, Agent, or Firm* — The Webb Law Firm

(57) ABSTRACT

The invention relates to a system for blocking a vehicle, a loading-unloading system provided therewith and a method therefor. The system includes a blocking device capable of moving along the vehicle; a blocking element attached to the blocking device capable of being positioned against a vehicle tire such that the vehicle is blocked; a blocking element extension mechanism configured to extend the blocking element from a retracted position to an extended position; height adjusting means for height adjustment of the blocking element; and calculation means for calculating the desired height of the blocking element with the blocking element in an extended position such that the blocking element is used for determining the position of the vehicle tire.

19 Claims, 9 Drawing Sheets

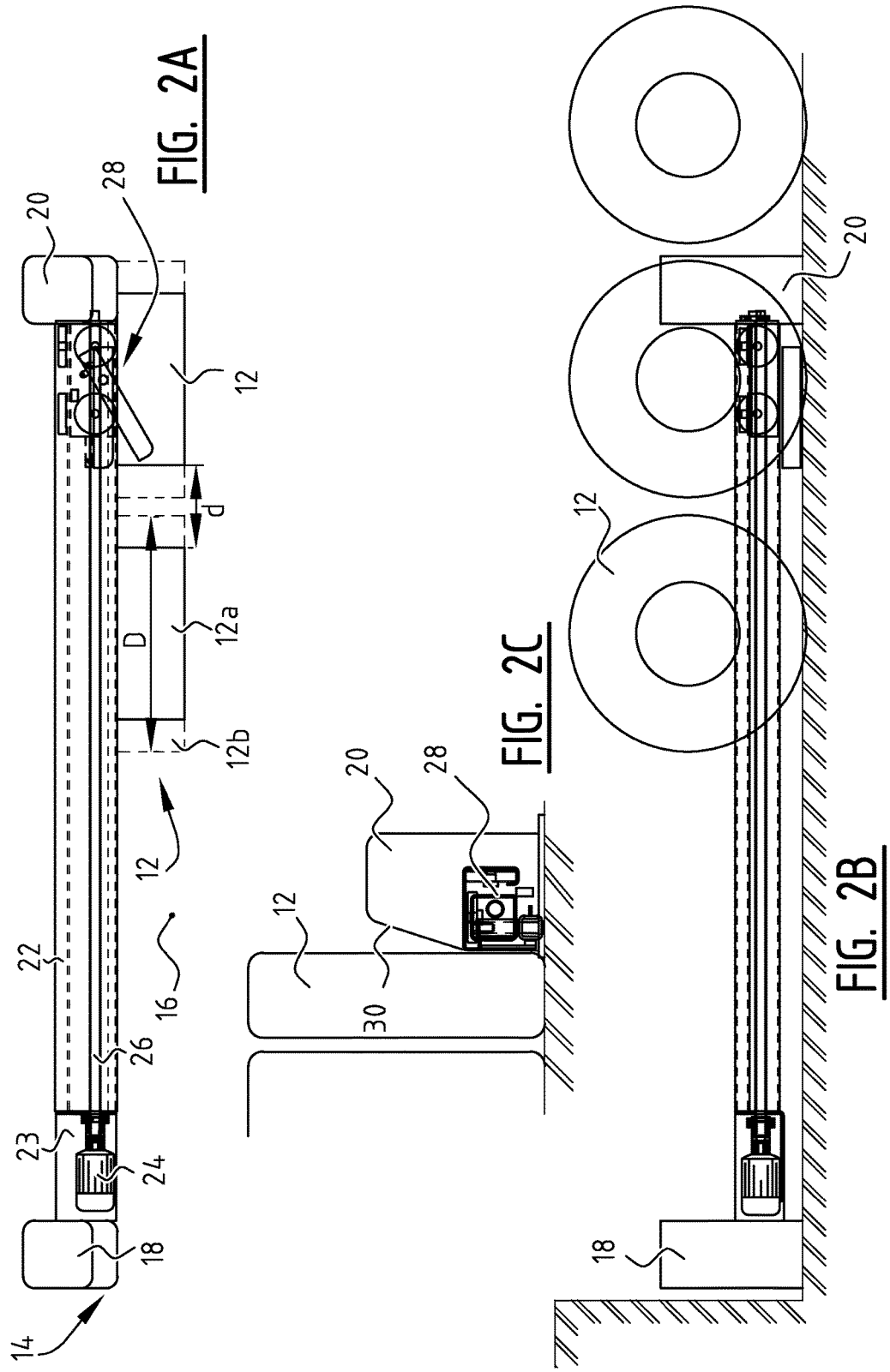

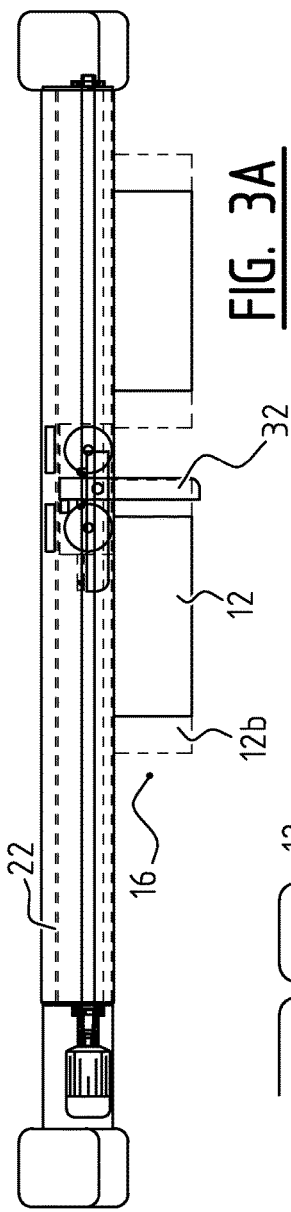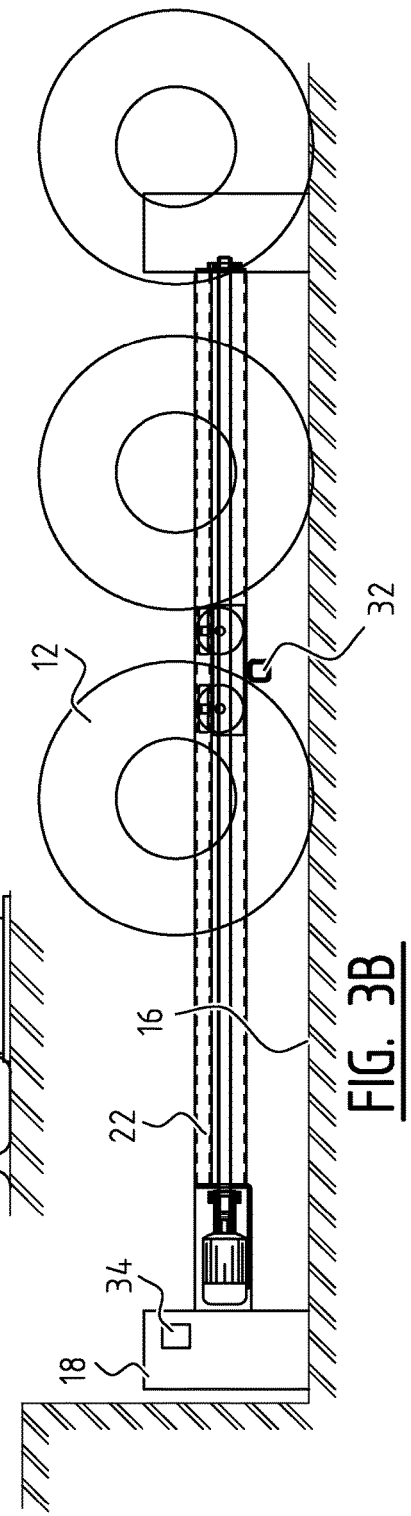

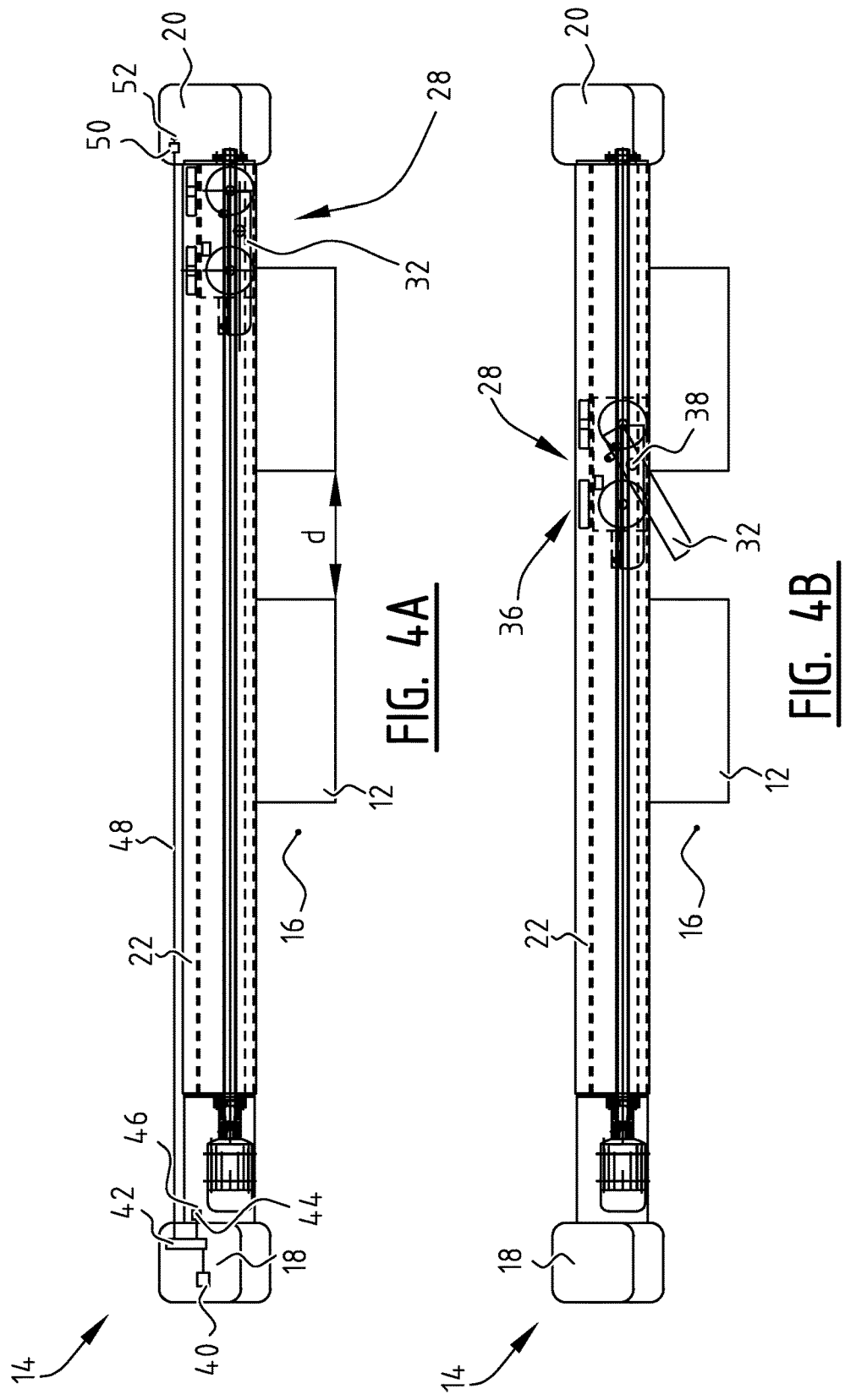

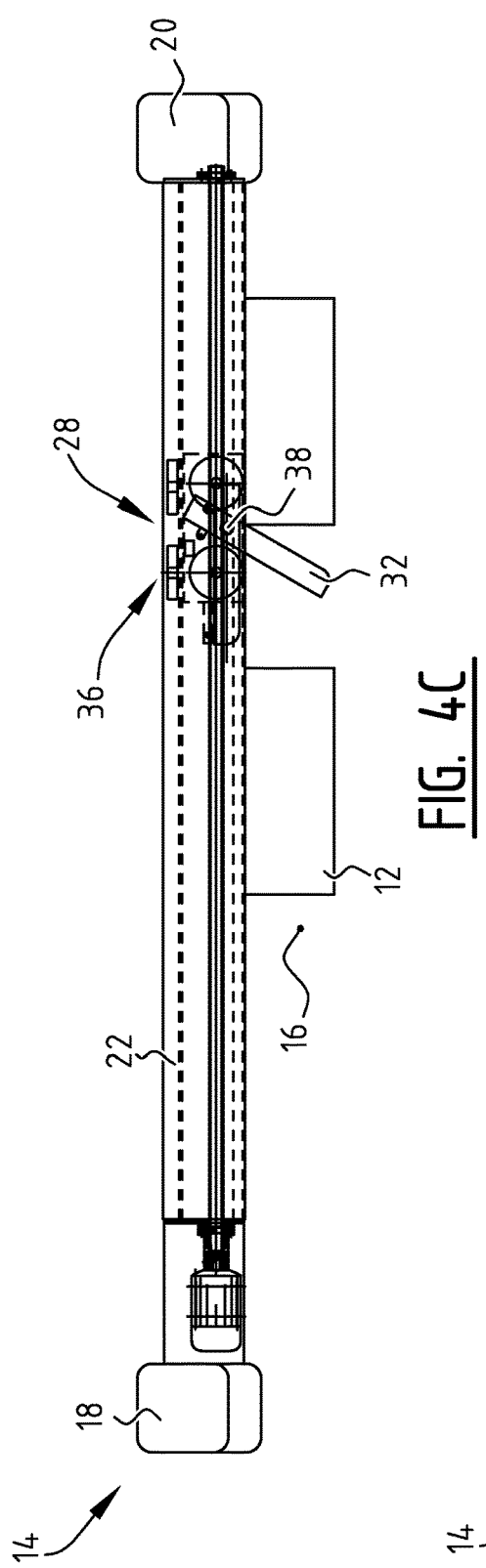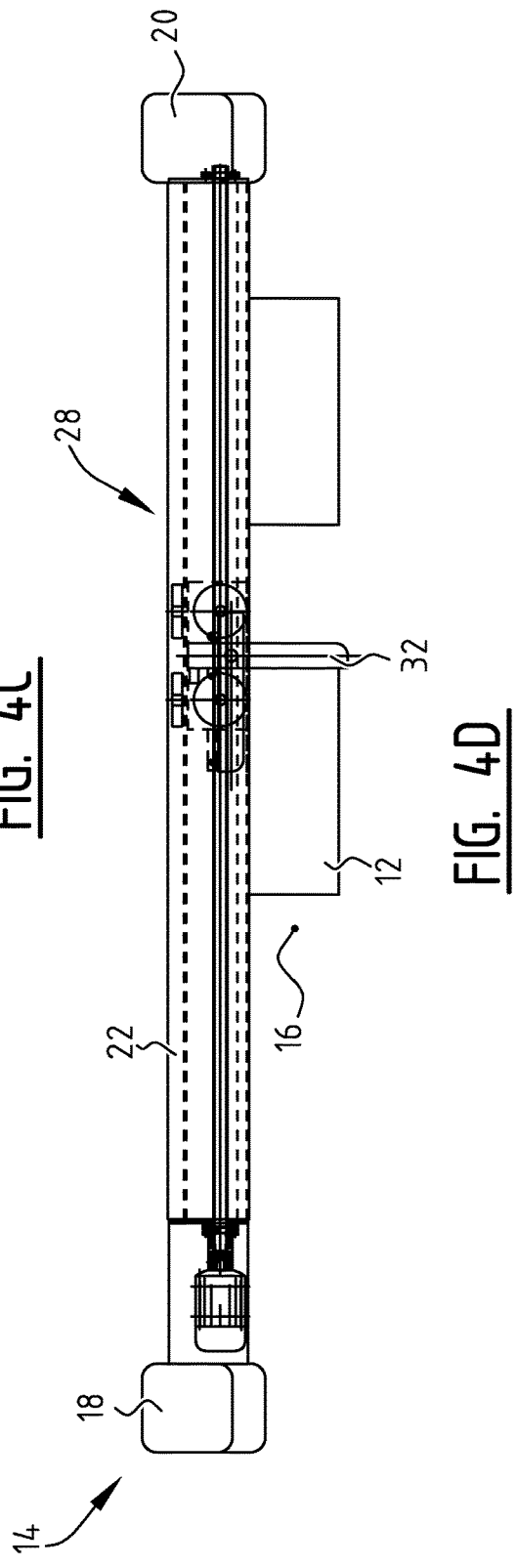

SYSTEM FOR BLOCKING A VEHICLE, METHOD THEREFOR AND DOCK PROVIDED THEREWITH

CROSS-REFERENCE TO RELATED APPLICATIONS

This application is the United States national phase of International Application No. PCT/NL2015/050482 filed Jul. 1, 2015, which claims benefit of U.S. Provisional Application No. 62/043,682, filed Aug. 29, 2014, and claims priority to Dutch Patent Application No. 2013389 filed Aug. 29, 2014, the disclosures of which are hereby incorporated in their entirety by reference.

BACKGROUND OF THE INVENTION

Field of the Invention

The present invention relates to a system for blocking a vehicle such as a truck. Such system is generally used for blocking a truck during loading and unloading at a loading-unloading station or a dock of a loading bay area of a distribution center, for example.

Description of Related Art

Devices for blocking trucks are per se known and for instance described in U.S. 2013/0341130 A1. The blocking device known here from makes use of a carriage that is moved over a guide track. As soon as the truck is positioned correctly relative to the loading-unloading station/dock a blocking element is moved into position in order to hold the rear wheel of the truck and make driving or rolling away impossible. To deal with the huge variation in vehicles, and more specifically in vehicle tires having different wheel diameters, this specific blocking device further comprises height-adjusting means for height adjustment of the guide track and/or the blocking element during use. Therefore, the above blocking device has provided a flexible blocking means such that a distribution center can be employed with sufficient flexibility for all types of vehicle, for example. NL 2004466 discloses a displacing means to displace a carriage from a first rest position to a second blocking position, wherein use is made of an energy storage system such that energy produced by the first vehicle as it drives away can be used to displace the carriage for a second vehicle.

A problem with known blocking devices is the dependency of sensors when determining the correct position of the blocking means relative to the vehicle tire. These sensors may relate to a variety of sensor types including direct contact and/or indirect contactless sensors using a variety of sensor technologies. This renders these blocking devices relatively complex with a large amount of parts rendering the blocking device relatively costly and sensitive to malfunction.

The present invention has for an object to obviate or at least reduce the above-stated problems with blocking devices, such as providing a cost effective and/or a robust blocking system that operates with minimum maintenance requirements.

SUMMARY OF THE INVENTION

The present invention provides for this purpose a system for blocking a vehicle, the system comprising:
a blocking device capable of moving along the vehicle;
a blocking element attached to the blocking device capable of being positioned against a vehicle tire such that the vehicle is blocked;
a blocking element extension mechanism configured to extend the blocking element from a retracted position to an extended position;
height adjusting means for height adjustment of the blocking element; and
calculation means for calculating the desired height of the blocking element with the blocking element in an extended position such that the blocking element is used for determining the position of the vehicle tire.

The system for blocking a vehicle comprises a blocking device that can be moved along a vehicle that is parked in the driveway of a loading-unloading station or a dock of a loading bay area of for instance a distribution center. A truck is reversely parked along this driveway for the purpose of loading and unloading goods. Preferably, the blocking element that is attached to the blocking device is capable of being positioned against one of the rear wheels or rear tires of the vehicle to be blocked. When the blocking element, such as a rod, bar, pen, etc. is in contact with the vehicle tire, the blocking device is blocked in its position. This provides an effective blocking of the vehicle preventing accidental and/or unauthorized movement of the vehicle. The system further comprises a blocking element extension mechanism that is configured to extend the blocking element from a retracted position to an extended position.

In a presently preferred embodiment, the blocking element is rotated by the mechanism around a substantially vertical shaft when brought from the retracted to the extended position or vice versa. Trucks have sufficient space available for this movement of the blocking element in a substantial horizontal plane provided the blocking element is close to the ground of the driveway during the rotation. This specific rotational movement around a substantially vertical axis has the advantage that a relatively simple movement can be performed without having the risk that during its movement the blocking element comes into inappropriate contact with parts of the truck that may even cause damage to the truck. Also, besides preventing damage to the truck, the functioning of the system is not at risk due to preventing the inappropriate contact with the truck. Therefore, the system according to the present invention provides an effective blocking means for blocking a vehicle that can be applied to a wide range of vehicles.

The system according to the invention further comprises height adjusting means for height adjustment of the blocking element such that the blocking element can be positioned correctly relative to the vehicle and more specifically relative to the specific vehicle tire thereof. The engaging height of the blocking element on the vehicle wheel/tire for blocking is adaptable to the type of vehicle. This renders the blocking system flexible in its use.

It is also possible to adapt the actual engaging height of the blocking element with the vehicle tire to the blocking requirement, for instance a relatively low engaging height to prevent the vehicle rolling away during loading and/or unloading in an anti-roll mode, and a relatively high engaging height to prevent unauthorized driving away with a vehicle during parking of the vehicle in a blocking mode. This enhances the applicability and the possible use of the device according to the invention.

Furthermore, the system according to the present invention comprises calculation means for calculating the desired height of the blocking element with the blocking element in an extended position such that a blocking element is used for determining the position of the vehicle tire. More specifically the blocking element is actively used for determining the vehicle tire diameter and the desired height of the blocking element. Preferably, the desired height of the blocking element is determined both on the vehicle tire diameter in combination with the desired function of the blocking element, i.e. preventing rolling away in an anti-roll mode or preventing unauthorized driving away in a blocking/locking mode.

As mentioned, determination of the desired height of the blocking element involves calculating the vehicle tire diameter. According to the invention, this diameter is determined with the blocking element in an extended position. The blocking element is brought into contact with the vehicle tire at two and preferably three or more different heights such that the vehicle tire diameter can be determined and the desired height of the blocking element can be calculated. This enables determining the desired height of the blocking element without a need for additional sensors. This obviates the risk of sensor fouling. The fouling of conventional sensors may depend on the weather conditions such as rain, snow, wind and/or an object hindering the measurement such as leafs. Calculating the desired height using the blocking element directly therefore provides an effective and robust system for blocking the vehicle. Such system substantially minimizes the risk of incorrect measurement with a sensor and/or the system not being available for use due to sensor malfunction. Furthermore, as use is made of the available blocking element for calculating the desired height of the blocking element the number of parts is reduced such that a cost effective system for blocking a vehicle can be provided.

In an advantageous preferred embodiment according to the present invention the extension mechanism comprises a spring element configured to extend the blocking element after passing a vehicle tire.

By providing a spring element the blocking element may move from its retracted position into its extended position as soon as the vehicle tire to be blocked is passed when the blocking device moves along the vehicle that is parked in the driveway. The use of the spring element further reduces the need for separate sensors and thereby provides enhances the robustness and stability of the system according to the present invention.

As a further effect, by obviating the need for separate sensors for determining the wheel/tire diameter, preferably in combination with the spring element, the need for separate floor mounted switch plates in the driveway of the loading/unloading station/docking station is removed. This further reduces the amount of parts rendering the system according to the invention cost effective. In addition, this further reduces the risk of malfunctioning due to sensor failure.

In a further advantageous preferred embodiment according to the present invention the height adjustment means comprise a height adjustment drive configured for changing the height of the blocking element.

Providing a height adjustment drive enables changing the height of the blocking element and adapting this height as function of the determined vehicle tire diameter and/or the desired anti-roll mode or locking mode of the system. In one of the preferred embodiments the height adjustment drive is provided in the blocking device and moves the blocking element relative to the blocking device and/or the blocking device in its entirety to reach the desired height.

In a further preferred embodiment according to the present invention, the system further comprises a guide track disposed along a driveway for guiding movement of the blocking device.

By providing a guide track the blocking device can be moved effectively along a vehicle that is parked in the driveway.

In one of the preferred embodiments of a system provided with a guide track the height adjustment means comprise a guide track height adjustment drive that is configured for changing the height of the guide track. By raising the entire guide track in height relative to the driveway the blocking element can be brought in its desired position to engage a vehicle tire at the required height.

Preferably, the height adjustment drive comprises a first lifting mechanism for lifting a first end of the guide track, a second lifting mechanism for lifting a second end of the guide track, and a drive connection configured for connecting the first lifting mechanism with the second lifting mechanism. The drive is preferably positioned in a substantially vertical post or cone of the guide track construction such that a connection to the other end of the guide track can be achieved mechanically with a shaft running through or along the guide track, hydraulically/pneumatically with (connected) cylinders and/or electronically such that the guide track can move substantially simultaneously with the lifting mechanisms, for example comprising a spindle, lifting belt or chain or more appropriate means.

Optionally, the height adjusting means comprise both a guide track height adjustment drive and a height adjustment drive that is mentioned earlier to further enhance the flexibility of the system according to the invention.

In a further preferred embodiment according to the present invention the system further comprises a self-propelled carrier configured to move the blocking device.

By providing a self-propelled carrier a guide track is no longer required thereby further reducing the parts of the system and rendering the system cost effective and/or more flexible in use. When a truck parks in the driveway the self-propelled carrier moves from its rest position along the truck in the driveway to the desired position, performs the calculations to determine the desired position of the blocking element, and positions the blocking element at the desired position.

The present invention also relates to a loading/unloading station, such as a dock of a distribution center, which is provided with a system as described above.

Such a loading/unloading station provides the same effects and advantages as described in respect of the system. In addition, the use of the system makes it possible to use each individual station of a distribution center for all categories and types of vehicle thereby increasing the flexibility of such a station.

The present invention further also relates to a method for blocking a vehicle in a desired position, comprising the steps of:
 providing a system and/or a loading/unloading station as described above;
 moving the blocking device along the vehicle;
 extending the blocking element with the blocking element extension mechanism after passing a vehicle tire;
 calculating the desired height of the blocking element with the calculation means after extending the blocking element; and
 positioning the blocking element at the desired height with the height adjustment means.

Such a method likewise provides the same effects and advantages as is described in respect of the system and/or the station.

The calculation of the desired height of the blocking element involves contacting the vehicle tire at two or more heights, preferably three heights, with the blocking element in an extended position. This obviates the need for separate sensors for determining the wheel dimensions.

In a preferred embodiment according to the present invention the method comprises the additional step of providing an additional force on the blocking element against the vehicle tire to compensate vehicle tire movement. This guarantees safe locking of the vehicle in case of accidental (unauthorized) movement of the vehicle. This additional force is preferably applied periodically, such as every ten seconds, thirty seconds, minute, fifteen minutes, hour, or day.

As mentioned earlier the blocking element is preferably positioned in an anti-roll mode or in a locking mode depending on the planned activity with a vehicle that is parked in a driveway.

BRIEF DESCRIPTION OF THE DRAWINGS

Further advantages, features and details of the invention are elucidated on the basis of preferred embodiments thereof, wherein reference is made to the accompanying drawings, in which:

FIG. 2A-C shows the system of FIG. 1 in a parked/rest position;

FIG. 3A-C shows the system of FIG. 2 in a locked position;

FIG. 4A-D shows an embodiment of the blocking element according to the invention;

DETAILED DESCRIPTION OF THE INVENTION

Figure 1:
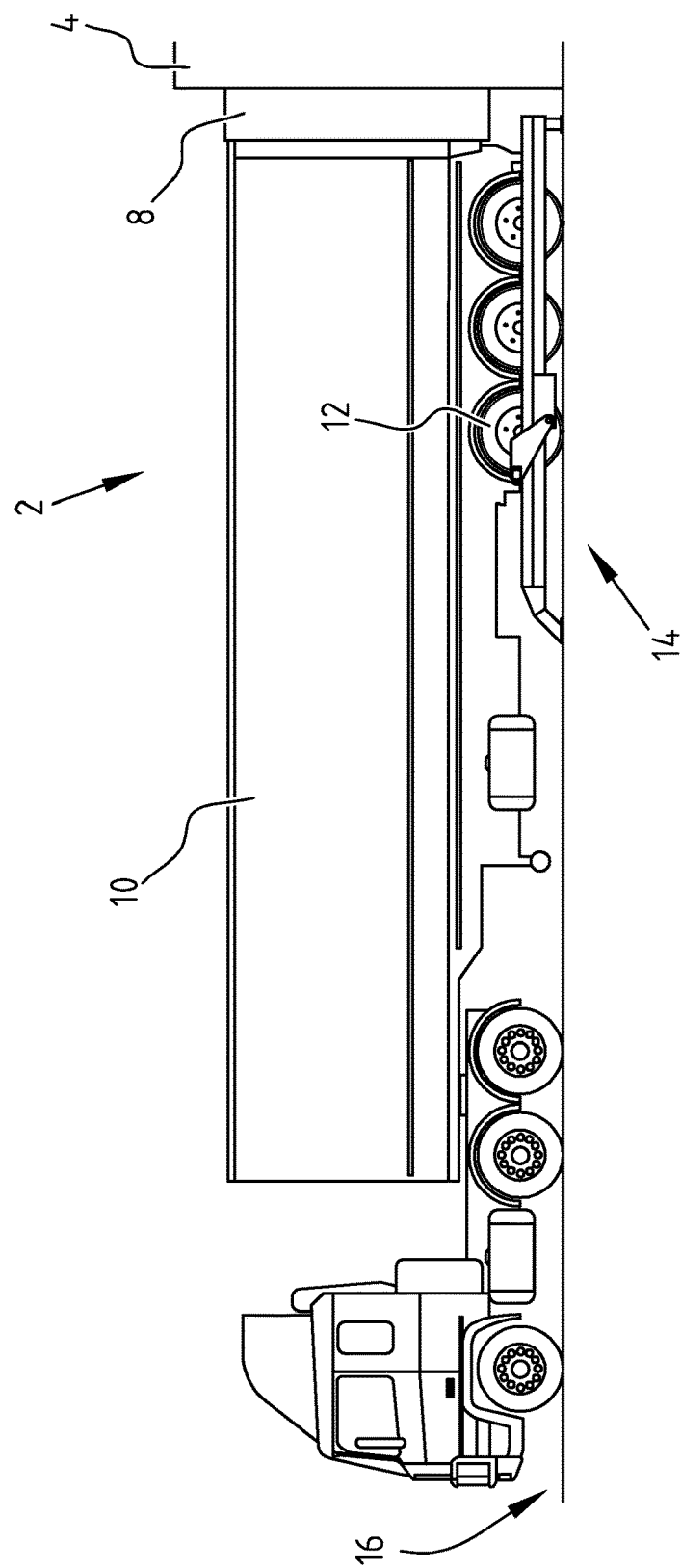
FIG. 1 shows a view of a loading/unloading station at a distribution center.

A loading bay area 2 (FIG. 1) is provided at a building with dock 4. Dock 4 is provided with an opening or door 6 and a so-called dock shelter 8 for protection thereof. A truck 10 is reversed to area 2, inter alia with rear wheels 12. Truck 10 moves here substantially parallel to blocking system 14 in driveway 16.

In the illustrated embodiment blocking system 14 (FIGS. 2A-C and 3A-C) comprises first column or cone 18 and second column or cone 20 between which extends guide track 22. First column 18 is provided close to building 4 and is provided with housing 23 comprising motor 24. In this illustrated embodiment motor 24 with shaft 26 drives blocking device 28. It will be understood that also other configurations for moving blocking device 28 could be applied. Examples of such drives can be found in U.S. 2013/0341130 that is included by reference herein. In the illustrated embodiment tire 12 is illustrated from above (FIG. 2A and FIG. 3A) with the opening between adjacent tires 12 at a height of 150 mm with cross-section 12a above driveway 16 being indicated with d, while the tire diameter with cross-section 12b is indicated with D. In the parked position (FIG. 2A-C) blocking device 28 is positioned at or close to second column 20, and therefore positioned at a relatively large distance from dock 4. In the illustrated embodiment, when moving blocking device 28 from this start position, the top of guide track 22 is preferably below a height of 300 mm above driveway 16. In this illustrated embodiment columns 18, 20 are provided with an inclined surface 30 guiding the substantially vertical movement of guide track 22 and blocking device 28 when positioning at the desired height relative to tire 12.

In a locked position (FIGS. 3A-C), blocking device 28 has been moved along guide track 22 to the locking position wherein the blocking element shaped as blocking rod 32 is brought into an extended position in the blocking mode of blocking device 28. Furthermore, in the illustrated embodiment, guide track 22 is brought at an elevated height relative to driveway 16. This height is calculated with calculating means 34 as function of the tire diameter D of vehicle tire 12 and, optionally, the intended anti-roll mode or locking mode of blocking device 28. In the illustrated embodiment, calculation means 34 comprise a processor that is provided in column 18. It will be understood that calculation means 34 can also be located at other locations, including in dock 4. Optionally, a display (not shown) is provided in dock 4 to enable an operator to control and/or monitor blocking system 14.

When bringing blocking device 28 from a parked/rest position to a locked position (FIGS. 4A-D), blocking element 32 is also brought from a retracted position (FIG. 4A) to a fully extended position at an angle of about 90° to guide track 22 (FIG. 4D) with illustrated intermediate positions of blocking element 32 at angles of 30° (FIG. 4B) and 60° (FIG. 4C). Movement of blocking element 32 starts when system 14 is activated and blocking device 28 starts to move along a parked vehicle with tires 12. When blocking element 32 enters space or distance d between two adjacent tires spring element 36 causes blocking element 32 to rotate around substantially horizontal rotation shaft 38 (FIG. 4B).

In the illustrated embodiment (FIG. 4A) raising and lowering of guide track 22 is achieved with motor drive 40 (FIG. 4A) and reductor/connector 42 that is connected to a first lifting mechanism 44 (shown schematically in FIG. 4A). Lifting mechanism 44 may comprise a suitable means such as a lifting cylinder, screw spindle or other means that is connected with lifting belt 46 (schematically shown in FIG. 4A) or other means to lift and/or lower guide track 22. Motor drive 40 is connected to the other end of guide track 22 through shaft 48 with second lifting mechanism 50 that comprises belt 52 or other means to raise and lower guide track 22. It will be understood that other means for raising and/or lowering guide track 22 including cylinders, spindles, chains, belts, and the like could also be envisaged by the skilled person.

Figure 5A:
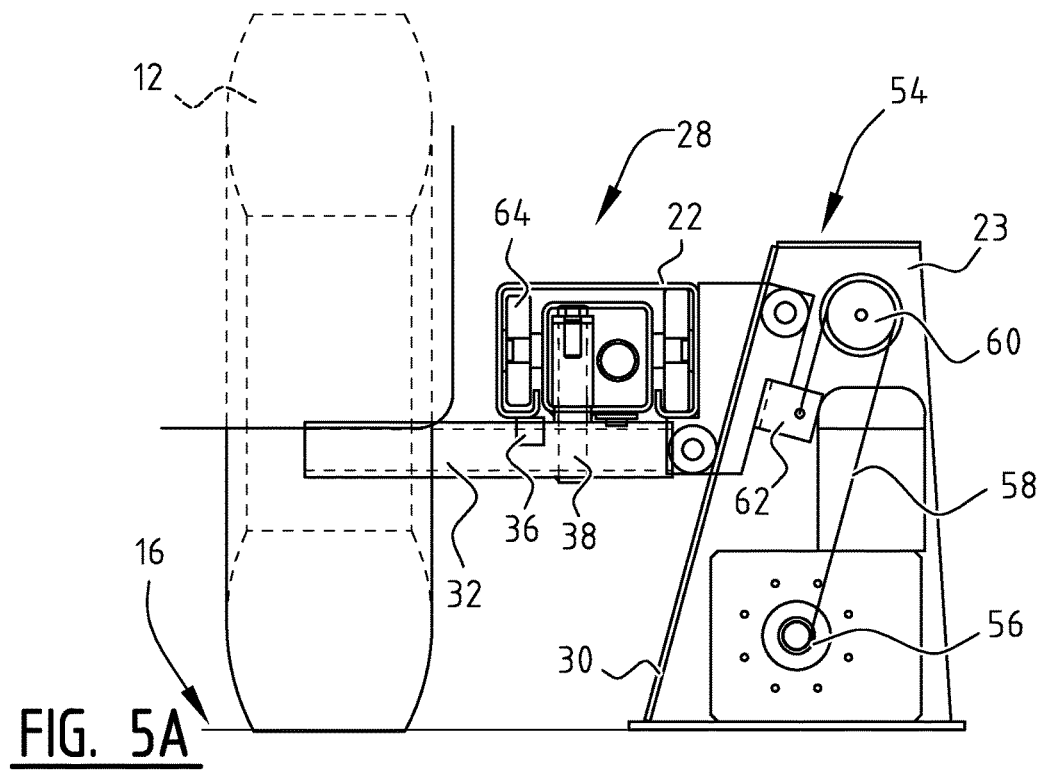
FIG. 5A-C shows an embodiment of the blocking device according to the invention.
Figure 5B:
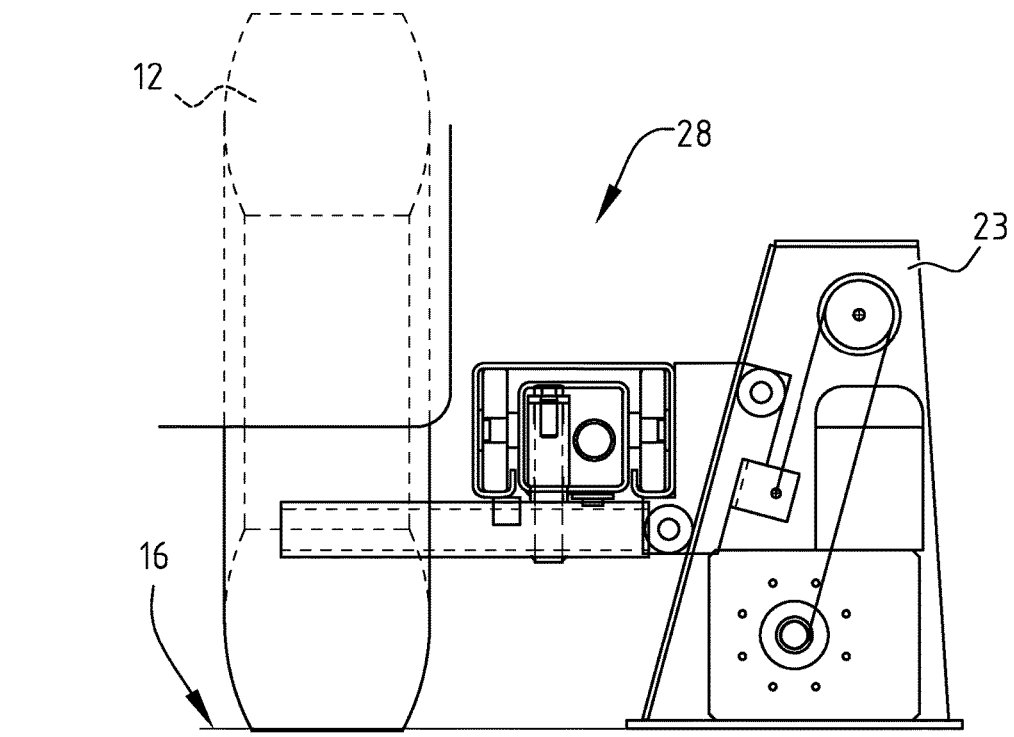
Figure 5C:
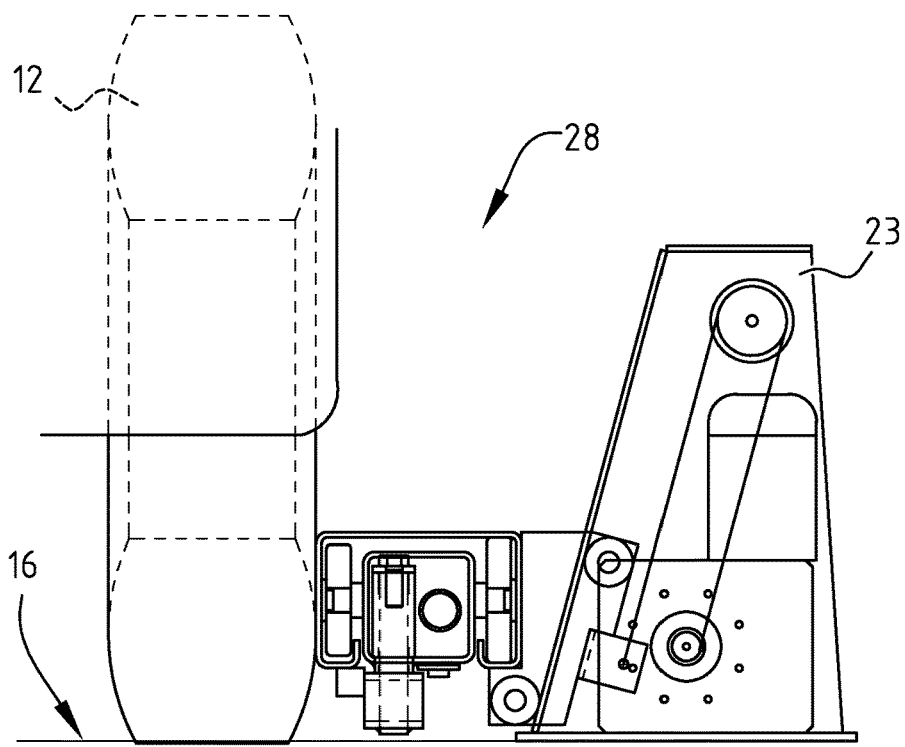
Figure 6A:
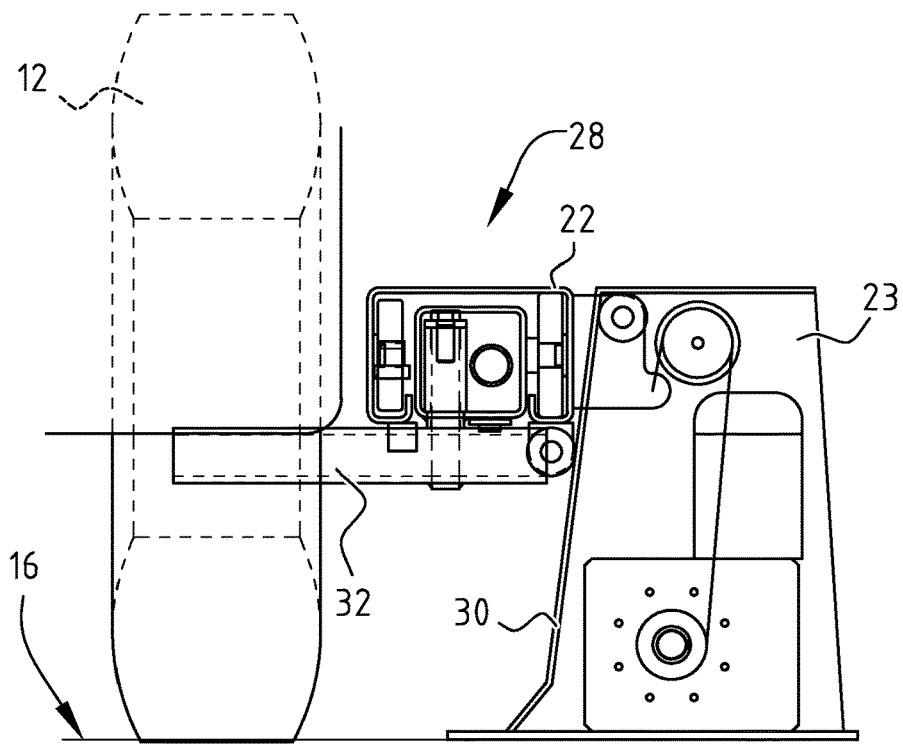
FIG. 6A-C shows an alternative embodiment of the blocking device according to the invention.
Figure 6B:
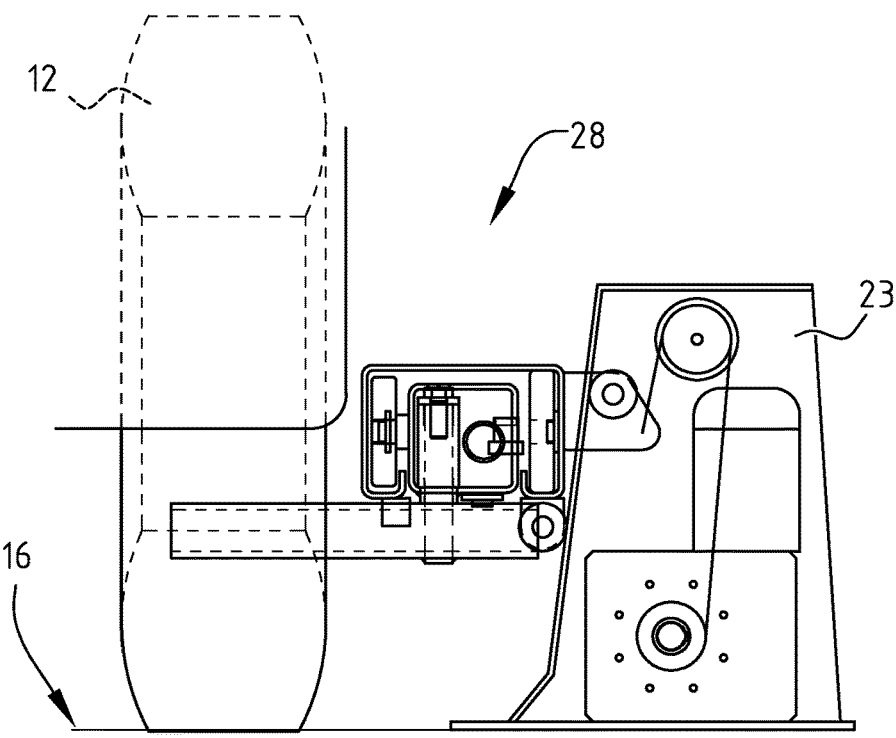
Figure 6C:
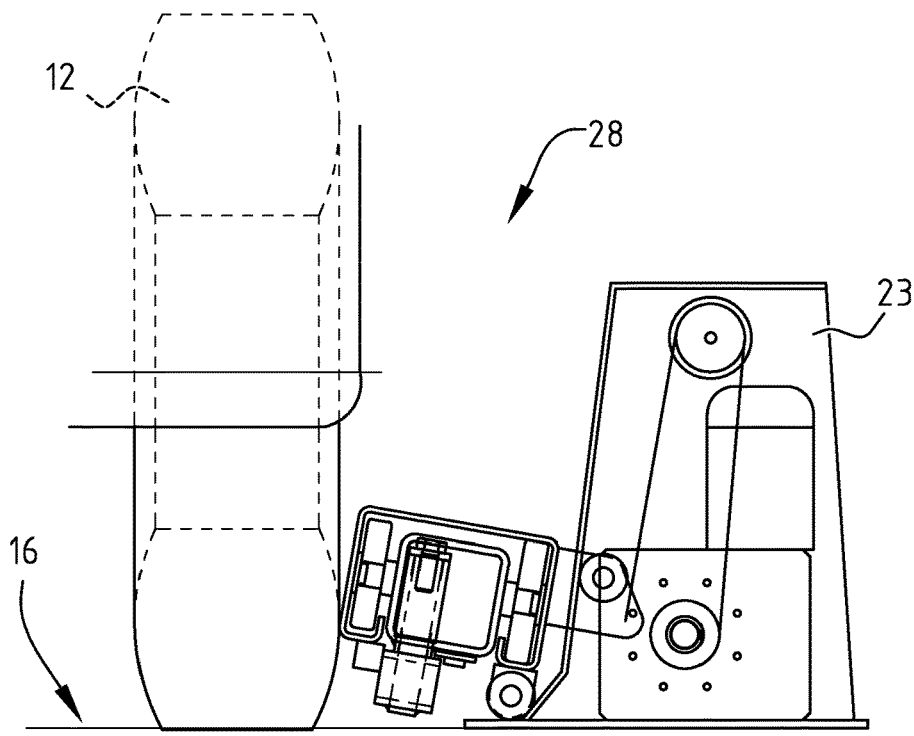

In illustrated embodiments (FIG. 5A-C and FIG. 6A-C) blocking device 28 is guided with guide track 22 over surface 30 of columns 18, 20. Surface 30 is provided at an inclined angle relative to the vertical. Blocking device 28 moves in a vertical direction over surface 30 and at the same time provides a horizontal movement due to the inclined angle. Blocking device 28 is moved along driveway 16 at the lower position (FIG. 5C and FIG. 6C). Lifting device 28 can be brought in an anti-roll position (FIG. 5B and FIG. 6B) and in a locking position (FIG. 5A and FIG. 6A). In this illustrated, the height adjusting means 54 comprise a motor 56, belt 58, pulley 60 and contact block 62 that is connected to guide track 22. Blocking device 28 moves along guide track 22 with guiding wheels 64. The inclination of surface 30 is about 10-30° relative to the vertical such that an appropriate horizontal distance relative to tire 12 can be guaranteed. At a low position of blocking element 28 close to the ground surface of driveway 16 a maximum of space is available for movement of blocking element 32 between a retracted and extended position. Due to the small horizontal displacement of blocking device 28 when being raised the risk of undesired contact between blocking system 14 and truck 10 is being prevented while the function of blocking element 32 remains intact.

In a further alternative embodiment, blocking device 28 is lifted and/or lowered relative to guide track 22 with a separate lifting mechanism (not shown).

Figure 7:
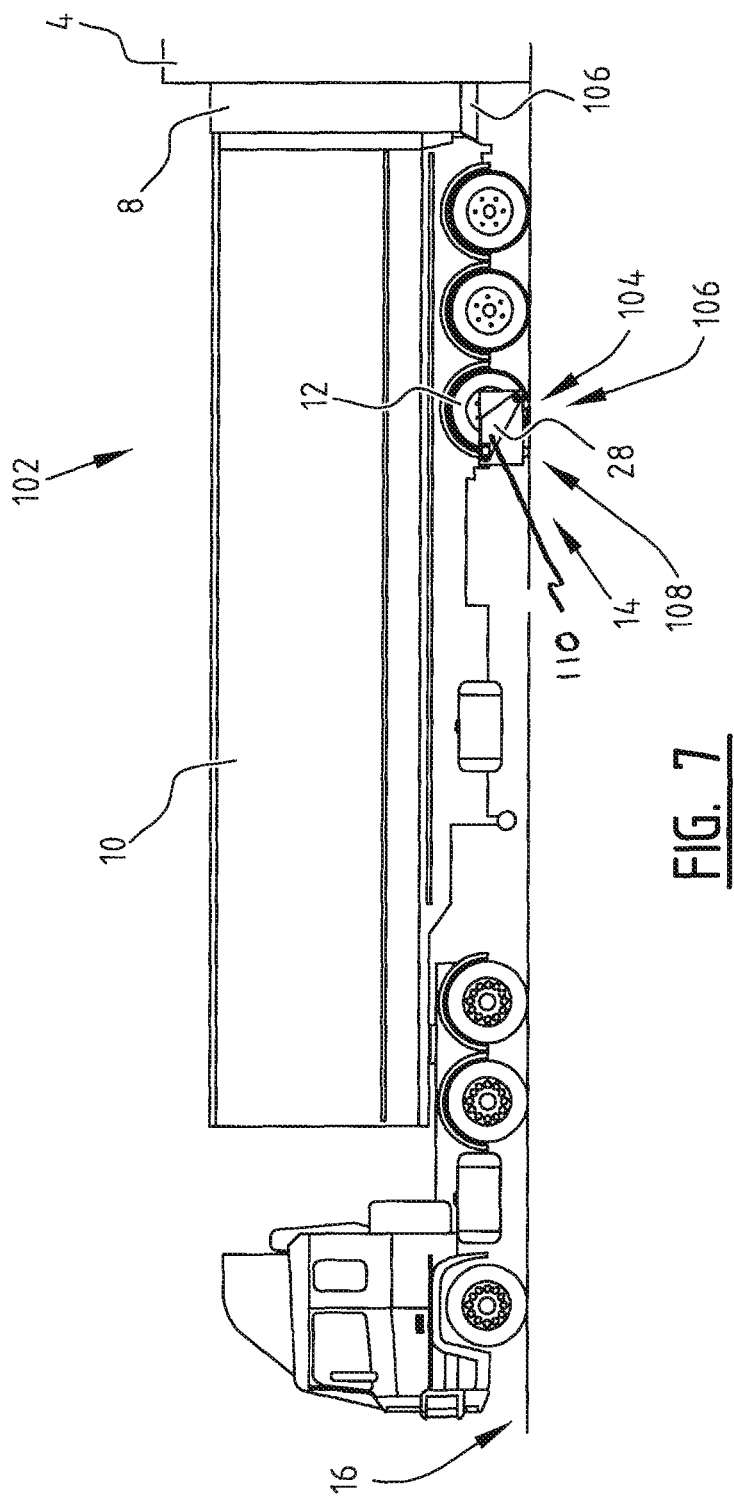
FIG. 7 shows a further alternative embodiment with a self-propelled blocking device.

In a further alternative embodiment, system 102 (FIG. 7) comprises a carrier 104 comprising blocking device 28. In a rest position, carrier 104 is positioned under shelter/charging station 106 capable of charging batteries 108 of carrier 104. After a truck is parked in driveway 16, carrier 104 starts moving independently along driveway 16 to the desired blocking position using sensors 110 within the carrier 104. Movement of carrier 104 preferably is autonomously due to the presence of one or more batteries 108. At the blocking position the truck is blocked by blocking device 28.

When truck 10 is parked along driveway 16, and has reached its stationary position relative to dock shelter 8, blocking system 14 (FIGS. 1-6) is activated and blocking device 28 starts to move from its rest position to a blocking position at a low height just above the surface of driveway 16. When moved past the tire 12 in the illustrated embodiment, blocking element 32 starts to rotate in a substantially horizontal plane around shaft 38 at this low height relative to the surface of driveway 16. Next, at a first height, blocking element 32 is brought into contact with tire 12. The position of this contact is determined. Then, at a second and optionally further height, different from the first height, a second and optionally further position of contact between blocking element 32 and tire 12 is determined, such that calculation means 34 are capable of determining tire diameter D. After determining tire diameter D and the desired function, i.e. anti-roll mode or blocking mode, the desired height of blocking element 32 is calculated. Then, blocking device 28 is moved, such that blocking element 32 is brought at the desired height into contact with tire 12. This movement of blocking device 28 may involve movements of blocking device 28 relative to guide track 22 and/or raising or lowering guide track 22 with blocking device 28 relative to columns 18, 20 and the surface of driveway 16. This ensures a correct position of blocking element 32. When vehicle 10 is authorized to leave blocking element 32 is lowered, rotated back to its retracted position, and blocking device 28 is returned to its parked/rest position. A similar operation is performed for autonomous system 102 (FIG. 7) without the use of guide track 22 and columns 18, 20, for example.

The present invention is by no means limited to the above described preferred embodiments thereof. The rights sought are defined by the following claims, within the scope of which many modifications can be envisaged.

The invention claimed is:

1. A system for blocking a vehicle, comprising:
   a blocking device capable of moving along the vehicle;
   a blocking element attached to the blocking device capable of being positioned against a vehicle tire such that the vehicle is blocked;
   a blocking element extension mechanism configured to extend the blocking element from a retracted position to an extended position;
   a height adjuster configured to adjust a height of the blocking element; and
   a calculator configured to calculate a desired height of the blocking element with the blocking element in an extended position such that the blocking element in an extended position is brought into a first contact with the tire at a first height, the position of this first contact being determined; and to at least a second height, the position of this at least second contact being determined, such that the calculator is capable of determining tire diameter of the vehicle tire and using this for calculating the desired height of the blocking element into contact with the tire.

2. The system according to claim 1, wherein the extension mechanism comprises a spring element configured to extend the blocking element after passing the vehicle tire.

3. The system according to claim 1, wherein the height adjuster comprises a height adjustment drive configured for changing the height of the blocking element.

4. The system according to claim 1, further comprising:
   an anti-roll mode, wherein the blocking element engages the tire at a first height; and
   a locking mode, wherein the blocking element engages the tire at a second, greater height.

5. The system according to claim 1, further comprising a guide track disposed along a driveway for guiding movement of the blocking device.

6. The system according to claim 5, wherein the height adjuster comprises a guide track height adjustment drive configured for changing the height of the guide track.

7. The system according to claim 6, wherein the drive comprises a first lifting mechanism for lifting a first end of the guide track, a second lifting mechanism for lifting a second end of the guide track, and a drive connection configured for connecting the first lifting mechanism with the second lifting mechanism.

8. The system according to claim 1, further comprising a self-propelled carrier configured to move the blocking device.

9. A loading and unloading system provided with a system according to claim 1.

10. A method for blocking a vehicle comprising the steps of:
    providing a system for blocking a vehicle and a loading and unloading station provided with such a system according to the following steps:
    moving a blocking device along the vehicle;
    extending a blocking element with a blocking element extension mechanism after passing a vehicle tire;
    calculating a desired height of the blocking element with a calculator after extending the blocking element; and
    positioning the blocking element at the desired height with a height adjuster, wherein the desired height is calculated from vehicle tire material positions determined from contacting the vehicle tire at two or more heights with the blocking element in the extended position.

11. The method according to claim 10, further comprising the step of providing an additional force on the blocking element against the vehicle tire to compensate vehicle tire movement.

12. The method according to claim 11, wherein the additional force is applied periodically.

13. The method according to claim 10, further comprising the step of choosing to position the blocking element in an anti-roll mode or in a locking mode.

14. The method according to claim 10, further comprising the step of choosing to position the blocking element in an anti-roll mode or in a locking mode.

15. The method according to claim 11, further comprising the step of choosing to position the blocking element in an anti-roll mode or in a locking mode.

16. The system according to claim 2, wherein the height adjuster comprises a height adjustment drive configured for changing the height of the blocking element.

17. The system according to claim 2, further comprising:
   an anti-roll mode, wherein the blocking element engages the tire at a first height; and
   a locking mode, wherein the blocking element engages the tire at a second, greater height.

18. The system according to claim 3, further comprising:
   an anti-roll mode, wherein the blocking element engages the tire at a first height; and
   a locking mode, wherein the blocking element engages the tire at a second, greater height.

19. The system according to claim 3, further comprising a guide track disposed along a driveway for guiding movement of the blocking device and wherein the height adjuster comprises a guide track height adjustment drive configured for changing the height of the guide track.

* * * * *